US007349062B2

(12) United States Patent
Neil et al.

(10) Patent No.: US 7,349,062 B2
(45) Date of Patent: *Mar. 25, 2008

(54) ANAMORPHIC THREE-PERFORATION IMAGING SYSTEM

(75) Inventors: Iain A. Neil, Calabasas, CA (US); Takuo Miyagishima, Torrance, CA (US); John James Galt, Glendale, CA (US)

(73) Assignee: Panavision International, L.P., Woodland Hills, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 11/003,858

(22) Filed: Dec. 3, 2004

(65) Prior Publication Data

US 2005/0225727 A1    Oct. 13, 2005

Related U.S. Application Data

(63) Continuation-in-part of application No. 10/927,731, filed on Aug. 27, 2004, now Pat. No. 7,148,947.

(60) Provisional application No. 60/560,800, filed on Apr. 7, 2004.

(51) Int. Cl.
*G03B 19/18* (2006.01)
*G03B 41/00* (2006.01)

(52) U.S. Cl. .......................... 352/38; 352/79

(58) Field of Classification Search ............ 352/38, 352/44, 79, 160, 241; 359/668
See application file for complete search history.

(56) References Cited

U.S. PATENT DOCUMENTS 2,890,622 A    6/1959  Wallin (Continued)

FOREIGN PATENT DOCUMENTS

WO     WO 93/12456     6/1993

OTHER PUBLICATIONS

M. Lente, "The Proposed Trilent-35 System", American Cinematographer, Jun. 1976, pp. 654-659.

(Continued)

*Primary Examiner*—Rodney Fuller
(74) *Attorney, Agent, or Firm*—Morrison & Foerster LLP

(57) ABSTRACT

An anamorphic imaging system is disclosed which maximizes the use of available image area to minimize display magnification and image degradation due to display magnification, reduces the amount of anamorphic squeeze or stretch during photography to lower image degradation due to anamorphosis, and in film applications, utilizes a film frame that is only three perforations in height to reduce the amount of original film needed. The frame for either film or digital applications has an aspect ratio of approximately 16:9, is contained within the total available frame area of a three-perforation frame or digital imager, and is sized to maximize image area. In preferred embodiments, the image capture area is approximately 0.900 inches wide by approximately 0.506 inches tall.

19 Claims, 8 Drawing Sheets

U.S. PATENT DOCUMENTS

| | | |
|---|---|---|
| 3,143,033 A | 8/1964 | Shearer |
| 3,637,297 A | 1/1972 | Yoshida |
| 3,865,738 A | 2/1975 | Lente |
| 5,481,321 A | 1/1996 | Lipton |
| 5,745,213 A | 4/1998 | Goodhill et al. |
| 6,188,833 B1 | 2/2001 | Makino et al. |
| 2003/0043344 A1 | 3/2003 | Goodhill |
| 2004/0196570 A1 | 10/2004 | Nurishi |
| 2005/0225726 A1* | 10/2005 | Miyagishima et al. ...... 352/241 |

OTHER PUBLICATIONS

R. Ericson, "Three-Perf in the Future!", American Cinematographer, Jul. 1986, pp. 71-74.

N. D. Bernstein, et al., "A Universal Format for Film Production", Journal of the SMPTE, Sep. 1973, vol. 82. (3 pages).

"Shiga Rear Anamorph", *Lens Diagram and Optical Prescription*, Oct. 21, 1997, Revised Dec. 22, 1997 (2 pp).

* cited by examiner

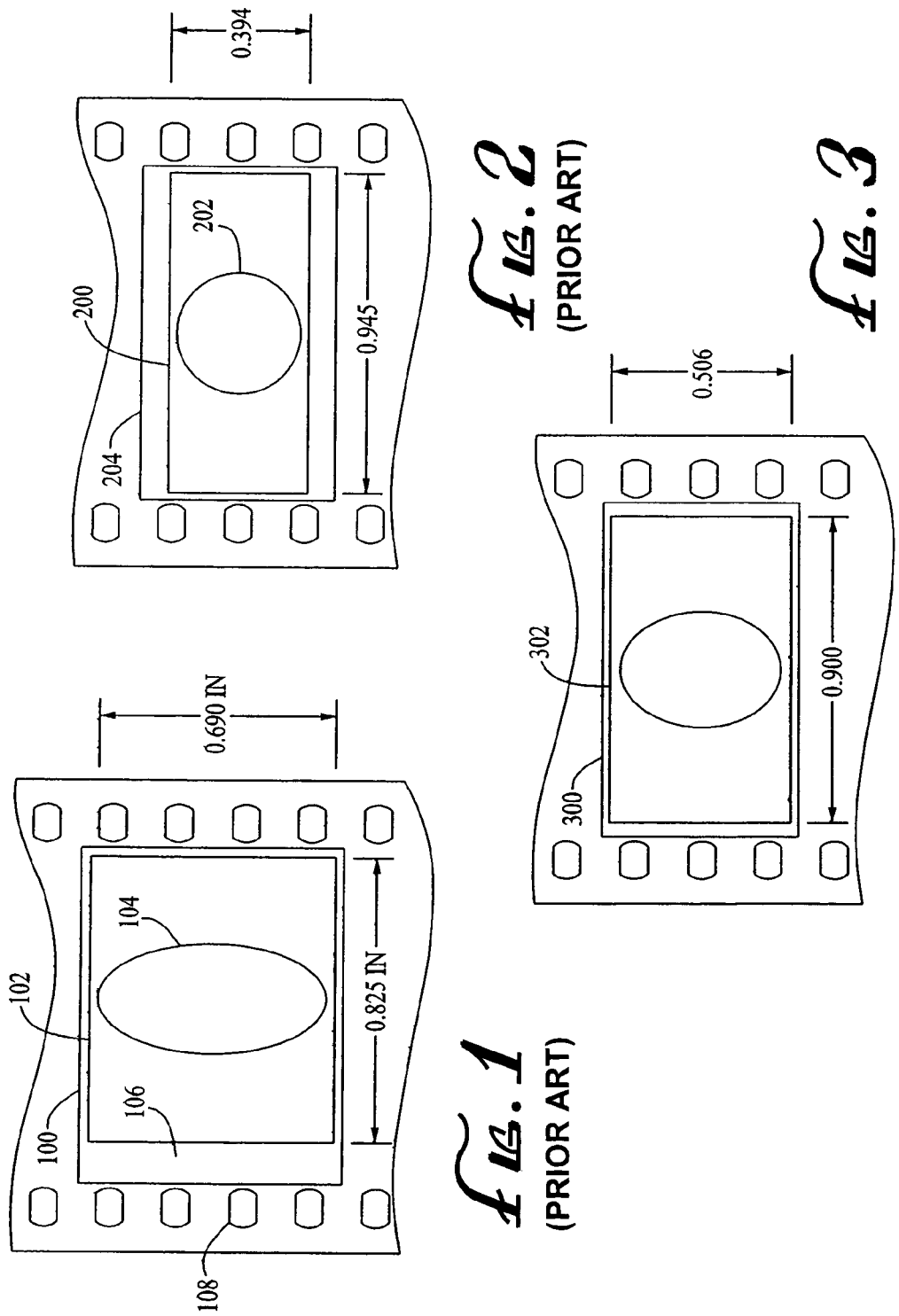

ANAMORPHIC THREE-PERFORATION IMAGING SYSTEM

CROSS-REFERENCE TO RELATED APPLICATIONS

This application is a Continuation-In-Part (CIP) of U.S. application Ser. No. 10/927,731 entitled "Anamorphic Three-Perforation Imaging System" filed on Aug. 27, 2004 now U.S. Pat. No. 7,148,947, which claims priority to U.S. Provisional Application No. 60/560,800 filed on Apr. 7, 2004, entitled "Anamorphic Three-Perforation Imaging System," and is related to U.S. Utility application Ser. No. 10/923,289 filed on Aug. 20, 2004, entitled "Anamorphic Imaging System," the contents of which are incorporated by reference herein.

BACKGROUND OF THE INVENTION

1. Field of the Invention

The present invention relates, generally, to the optimization of image quality when the aspect ratio of the acquisition format is a generally recognized standard and the display aspect ratio is represented by a different but also generally recognized standard.

2. Description of Related Art

In the early 1950s, as a result of the perceived threat of television, motion pictures began to be released in various widescreen formats. Until this time the majority of feature films and television programs were released with frames having an aspect ratio of 1.33:1 (4:3). Although numerous widescreen formats were introduced in the 1950s, only a cropped version of the 1.33:1 aspect ratio commonly known as 1.85 (1.85:1 aspect ratio with dimensions of 0.825 inches by 0.446 inches) and Panavision®, an anamorphic optical system with a 2:1 horizontal squeeze and a 2.40:1 aspect ratio (0.825 inches by 0.690 inches), survive today as release print formats.

The Panavision® Anamorphic Format

The Panavision® anamorphic 2.40:1 widescreen system is generally preferred for major motion pictures because of its superior screen image quality. Panavision® was an improvement to an earlier anamorphic system introduced by 20th Century Fox as Cinemascope®, which used an anamorphic lens to squeeze the optical image onto the available film frame during filming. (Anamorphic lenses are essentially astigmatic; the magnification in the horizontal direction is different from the magnification in the vertical direction.)

FIG. 1 illustrates the SMPTE 195-2000 projection aperture standard for a film frame generated using the Panavision® anamorphic format. Area 100 is the full camera aperture, but area 102 (having an aspect ratio of approximately 1.2:1) is the portion of the film frame that is actually projected. The optical image in area 102 has been squeezed in a 2:1 ratio, and thus exemplary image 104, although appearing as an oval, is actually a circular image that has been photographed.

The original film may then be converted directly to release print film without changing or otherwise manipulating the format of FIG. 1. When projecting the release print film, another anamorphic projection attachment is used to unsqueeze the image. When unsqueezed during projection, area 102 will have an aspect ratio of approximately 2.40:1, and the oval exemplary image 104 will return to its correct circular shape.

Anamorphosis is typically employed to maximize the available image area on the film frame. The standard Panavision® anamorphic projection aperture is 0.825 inches×0.690 inches, resulting in an image area of 0.569 square inches. (See FIG. 1, also the SMPTE Standard). When compared to the 1.85:1 spherical widescreen format 0.825×0.446 with an area of approximately 0.368 square inches, the Panavision® anamorphic format has 55% more film area. In general, anamorphic optics are inferior to their spherical counterparts, and produce a degraded image. The greater the amount of anamorphosis (squeezing or stretching), the greater the degree of image degradation. Nevertheless, the Panavision® anamorphic format produces improved overall image quality because the increased image area reduces the amount of magnification needed to project the image on a theatre screen, as compared to the 1.85:1 spherical format. For example, to project an image that is 15 feet tall (as in a conventional movie theater), the Panavision® anamorphic format requires a 261× image magnification in the vertical direction, while the 1.85:1 format requires a 404× image magnification in the vertical direction. There is a direct correlation between magnification and image degradation, when viewed from the same distance. Because of the larger magnification required by the 1.85:1 format, film grain, dust or other imperfections in the film frame would appear much larger when projected in the 1.85:1 format as compared to the Panavision® anamorphic format.

It should be noted that the Panavision® frame of FIG. 1 is off-centered to leave area 106 for an optical soundtrack. This technique of generating an off-centered, right-shifted frame (a.k.a. "Academy frame") was developed because historically, the original film would be put in contact with another piece of film and the soundtrack would be recorded optically onto that piece of film to generate the release print film. Even today, this optical soundtrack is needed on release print film. Therefore, original film is still frequently shot "Academy centered" to leave room for the optically recorded soundtrack and other digital soundtracks.

FIG. 1 illustrates perforations 108 along either side of the film, used by pull-down mechanisms within cameras for advancing the film. The vast majority of film cameras and projectors use a mechanism for pulling down four perforations per frame, and thus the Panavision® frame illustrated in FIG. 1 has a height that spans four perforations.

Three-Perforation Formats that Preserve the Optical Soundtrack During Capture U.S. Pat. No. 3,865,738 entitled "Method of Making Motion Pictures" issued to Miklos Lente on Feb. 11, 1975 (hereinafter "the Lente patent") describes a system using 35 mm frames three perforations in height for the purpose of saving original film. This savings would not apply to theatrical release print film, however, because the Lente patent system envisioned converting the original film to release print film, with its standard four perforations per frame.

The Lente patent envisioned capturing Academy centered images with a horizontal squeeze on the original film within a three perforation frame, with the optical soundtrack preserved at the left edge of the frame (see FIG. 6 of the Lente patent). This original film would then be converted to conventional print film with four perforations per frame (see FIG. 8 of the Lente patent) by stretching the image optically in the vertical direction using an optical printer on an optical bench. The conventional print film could then be used on conventional projectors with 2:1 anamorphic projection attachments with mechanisms for pulling down four perforations per frame. Again, the image area of the original negatives extracted for projection would be much smaller than the standard Panavision® anamorphic projection aperture. The image would be degraded by its extraction for projection conversion to release print film using an optical printer, and additional magnification needed during projection due to the smaller negative image area, and therefore would be of inferior quality as compared to the Panavision® anamorphic format.

Lente also authored "The Proposed Trilent-35 System" in the June 1976 issue of American Cinematographer (hereinafter "the Lente article"). The Lente article disclosed a system similar to the Lente patent which would have the same image quality limitations (see FIGS. 7 and 8 in such Lente article).

35 mm negatives with only three perforations per frame was also disclosed in "Three-Perf in the Future" by Rune Ericson in the July 1986 edition of American Cinematographer (hereinafter "Ericson"). Ericson proposed the use of three perforation frames for both original film and release prints in order to save on film costs. Ericson envisioned an image area within a three perforation frame and with the optical soundtrack preserved at the left edge of the frame for obtaining print frames with a 1.85:1 aspect ratio without the use of anamorphosis during filming. However, the three-perforation high release prints would require three-perforation projectors that were never adopted by the motion picture industry. Because the original film would be shot using a spherical lens and would not need to be converted using an optical printer, the image degradation that would result from the use of an anamorphic lens during filming and conversion to release print film on an optical printer would be avoided. Note, however, that the image area of this embodiment of Ericson would be smaller than the standard Panavision® anamorphic projection aperture of 0.569 square inches. Thus, although the image would not be degraded by anamorphosis during filming or during conversion on an optical printer, the overall image quality would be inferior as compared to the Panavision® anamorphic format due to the need for increased magnification during projection.

Three-Perforation Formats that Eliminate the Optical Soundtrack During Capture

As noted above, most original film is still shot off-centered to leave room for the optically recorded soundtrack and other digital tracks. While practical, this practice is wasteful of film area, and is not absolutely necessary, because the images can be Academy-centered when the negative film is converted to release print film. Because of the high cost of negative film, suggestions have previously been made for using the area reserved for the soundtrack during filming by extending the width of the frame from perforation to perforation (a.k.a. "film-centered"). Of course, the negative film must still be converted to Academy centered release print film.

Additionally, because of the high cost of original film negatives, suggestions have previously been made for reducing the height of a frame from four perforations to three perforations and removing the area reserved for soundtrack. For example, in "A Universal Format for Film Production" by N. D. Bernstein, M. Z. Wysotsky and B. N. Konoplev in the September 1973 Journal of the SMPTE, Vol. 82 (hereinafter "Bernstein"), 35 mm negatives with only three perforations per frame were disclosed (see FIG. 2). By pulling down three perforations per frame instead of four, a 25% savings in original film could be realized. This savings would not apply to release print film, however, because Bernstein envisioned converting the original film to release print film with the standard four perforations per frame.

Bernstein and Ericson both envisioned a widescreen image area within the three perforation frame (see FIG. 2) that did not leave room for the optical soundtrack at the left edge of the frame for obtaining print frames with aspect ratios of 2.35:1 (today 2.40:1). Bernstein and Ericson both teach that no anamorphosis would be required during filming. Bernstein teaches, and Ericson mentions that as an alternative, the original film would have to be converted using an optical printer to a four perforation anamorphic internegative with an area at the left edge of the frame for the optical soundtrack, per FIG. 1, area 106. This conversion would require two operations, either squeezing in the horizontal direction and magnifying the image or alternatively stretching in the vertical direction and minifying the image, each operation contributing to image degradation. Note also that the image area of this embodiment of Bernstein would be only 0.412 square inches as compared to the standard Panavision® anamorphic camera aperture of 0.638 square inches (0.868"×0.735"). The image would therefore be degraded by both the anamorphic conversion to release print film and the increased magnification needed during projection, and therefore be of inferior quality when compared to the Panavision® anamorphic format. In Ericson, no anamorphosis would be required during filming or conversion to release prints, because Ericson envisioned release prints in three perforation having an aspect ratio of 2.35:1 today (2.40:1) without sound. Note that the image area of this embodiment of Ericson would also be smaller than the standard Panavision® anamorphic projection aperture. The image would therefore be degraded by the increased magnification needed during projection, and would be of inferior quality as compared to the Panavision® anamorphic format.

FIG. 2 illustrates a frame 200 of a film format known as "Super 35," having an aspect ratio of 2.40:1, today's anamorphic projection format, which was introduced to reduce the cost of 2.40:1 anamorphic original photography. Consistent with the Bernstein and Ericson proposals, this new format also utilizes a camera aperture that is contained within three perforations rather than the traditional 35 mm film frame that is four perforations in height. No anamorphosis is required during filming, as evidenced by the exemplary image 202, which appears as its correct circular shape on the film. The original film must still be converted to release print film having an area at the left edge of the frame for the optical soundtrack by squeezing in the horizontal direction or stretching in the vertical direction, and then either magnifying or minifying the image, but modern digital processes enable this conversion to occur without the degradation in image quality that would normally occur if the conversion was effected using an optical printer. The motion picture "Panic Room," for example, was filmed in three perforation Super 35 with an aspect ratio as shown in FIG. 2, and was digitally converted to the format of FIG. 1. The process of filming in Super35 with an aspect ratio of 2.40:1 was used to eliminate the distortion created by squeezing during filming. Note, however, that the image area of this embodiment is only 0.372 square inches when compared to the standard Panavision® anamorphic projection aperture of 0.569 square inches. Thus, although there is no image degradation during filming or during the conversion to release print film from Super 35, the image is nevertheless degraded by the increased magnification needed during projection.

The processes described above focused on reducing original negative film used in filming by using three perforation film frames rather than four. Some of these processes eliminated one or more of the contributors to image quality degradation by either eliminating anamorphosis during filming or eliminating the need for conversion to release print film using an optical printer. However they were unable to optimize the resulting image because they were unable to use the whole available image area (thereby increasing the amount of magnification needed during projection). Thus, a need exists for an anamorphic imaging system that maximizes image quality by maximizing the image area of the original negative film, thereby decreasing the amount of magnification needed during projection, while at the same time saving original negative film.

SUMMARY OF THE INVENTION

An anamorphic imaging system according to embodiments of the present invention utilizes a maximized image capture area in either cine or digital applications to reduce magnification and image degradation due to magnification when displayed, and to reduce the amount of anamorphic squeeze or stretch during photography to lower image degradation due to anamorphosis. The amount of horizontal anamorphic squeeze (for front anamorphs) or vertical anamorphic stretch (for rear anamorphs) used during widescreen photography is, for example, in the ratio of 2.40:1 over 16:9 or approximately 1.34 to maximize the image capture area. Alternatively, the amount of vertical anamorphic squeeze (for front anamorphs) or horizontal anamorphic stretch (for rear anamorphs) used during standard television (1.33:1 aspect ratio) photography is in the ratio of 16:9 over 1.33:1, which is also approximately 1.34. Note than an anamorphic squeeze or stretch other than this ratio will not maximize the image capture area and thus will not maximize overall image quality.

In film applications, the present invention utilizes a film frame that is only three perforations in height to reduce the amount of original film needed. The total available frame area in a three perforation high film frame is approximately 0.980 inches by 0.546 inches. Embodiments of the present invention capture images in a frame with an aspect ratio of 16:9, contained within the total available frame area and sized to maximize image area. A widescreen image (2.40:1) may be captured using an anamorphic lens with a horizontal squeeze ratio of approximately 1.34, chosen to horizontally squeeze the widescreen image to the size of the frame while maximizing the image capture area. In addition, a widescreen image may be captured using a rear anamorphic lens with a vertical stretch ratio of approximately 1.34, chosen to vertically stretch the widescreen image to the size of the frame, as described in related U.S. Utility application Ser. No. 10/923,289 entitled "Anamorphic Imaging System." Alternatively, a standard television image may be captured using an anamorphic lens with a vertical squeeze ratio of approximately 1.34, chosen to vertically squeeze the standard television image down to the size of the frame while maximizing the image capture area. In addition, the standard television image may be captured using a rear anamorphic lens with a horizontal stretch ratio of approximately 1.34, chosen to horizontally stretch the standard television image to the size of the frame, as described in related U.S. Utility application Ser. No. 10/923,289 entitled "Anamorphic Imaging System." Note that the same anamorphic lens with a 1.34 squeeze or stretch ratio, rotated 90 degrees, may be utilized to capture both formats on the same image capture area.

Additionally, the frame may be sized in consideration of digital imagers used for cine applications. Digital imagers may be employed for capturing images for standard television, digital television and motion pictures. Because of the international adoption of 16:9 (1.78:1) as a digital television aspect ratio, digital imaging systems for television and electronic cinematography are being designed to have an aspect ratio of 16:9. In addition, digital imagers for electronic cinematography applications are being designed with a size that approximates the area of three-perforation film as described above. As with film, embodiments of the present invention seek to maximize the active area of a digital imager by capturing a widescreen or standard television image using an anamorphic lens with a horizontal or vertical squeeze of approximately 1.34, respectively.

Preferred embodiments of the present invention therefore employ an image capture area with dimensions selected in consideration of multiple factors, some applicable to both film and digital applications, and some specific to either film or digital applications. The image capture area is selected to maximize the image area to reduce magnification and image degradation due to magnification, and reduce the amount of anamorphic squeeze or stretch during filming to lower image degradation due to anamorphosis. Use of a single image capture area also enables the same anamorphic lenses to be used for both film and digital capture. The image capture area is further selected to be only three perforations in height to reduce the amount of original film needed for film applications, and to fit within the maximum three perforation high image area of approximately 0.980 inches by 0.546 inches. The image capture area is still further selected to have an aspect ratio of 16:9 for digital television, and to fit within the total imaging area of a digital imager of approximately 0.945 inches by 0.532 inches.

The image capture area of preferred embodiments of the present invention is approximately 0.900 inches wide by approximately 0.506 inches tall, providing an aspect ratio of approximately 16:9. The image capture area fits within the total available film area of a three perforation film frame and the total imaging area of a digital imager.

For both film and digital applications, either widescreen or standard television images may be captured using the same anamorphic lens having an approximate 1.34:1 horizontal or vertical squeeze or stretch (rotated 90 degrees as needed), which is less than the 2:1 horizontal squeeze of the Panavision® anamorphic format. The reduced degree of anamorphosis combined with using practically the entire area of the three perforation film frame or total digital imaging area results in a screen image quality that is at least equivalent, and potentially superior to, the Panavision® anamorphic format, while still providing an approximate 25% film cost savings over the conventional four perforation format.

With regard to widescreen images, embodiments of the present invention utilize known digital processing techniques implemented by digital image processors to convert the original negative film or captured digital image to the format of FIG. 1, which avoids the additional degradation that would occur with the use of an optical printer lens.

In one embodiment of the present invention, a widescreen image captured on original film according to embodiments of the present invention may be digitally stretched vertically and then digitally resampled such that the resulting film print has the format of FIG. 1. In preferred embodiments, the original image is stretched by about 49% in the vertical direction. Alternatively, in another preferred embodiment of the present invention, the widescreen image on the original film is digitally squeezed horizontally and then digitally resampled such that the resulting film print has the format of FIG. 1. In this preferred embodiment, the original image is squeezed by about 49% in the horizontal direction. An anamorphic projection attachment with a 2:1 horizontal unsqueeze may then be used to project the release print film and produce the final 2.40:1 projected image.

In another embodiment of the present invention, a widescreen image captured on a digital detector sized according to embodiments of the present invention (i.e., having an aspect ratio of about 1.78:1) may be magnified or minified as needed, but without further stretching or squeezing, to fit into the display area of the projection chip in current state of the art digital cinema projectors, which may have an aspect ratio of about 1.9:1. In this embodiment, a minimal amount of the width of the projection chip will not be used. An anamorphic projection attachment with a 1.34:1 horizontal unsqueeze may then be used to project the 1.78:1 aspect ratio captured image and produce the final 2.40:1 projected image. Alternatively, the captured widescreen image may be converted using digital processing techniques (magnifying, minifying, stretching or squeezing as needed) implemented by digital image processors to precisely fit the 1.9:1 aspect ratio projection chip. An anamorphic projection attachment with a 1.26:1 horizontal unsqueeze may then be used to project the 1.9:1 aspect ratio digital image and produce the final 2.40:1 projected image. Note that digital cinema projectors with other aspect ratios may also be supported simply by changing the digital processing and anamorphic projection of the captured image.

In another embodiment of the present invention, a widescreen image captured on a digital detector sized according to embodiments of the present invention may be digitally stretched horizontally by about 34% or digitally squeezed vertically by about 34% to restore the 2.40:1 aspect ratio, then digitally processed as needed for use in digital applications (digital television, LCD screens on cameras and camcorders, etc.).

In another embodiment of the present invention, a standard television image captured on a digital detector sized according to embodiments of the present invention may be converted using digital processing techniques to an image with an aspect ratio of about 1.9:1, which may be the aspect ratio of current state-of-the-art DLP projectors, and then optionally digitally magnified or minified to fit the actual projection area of the DLP projector. An anamorphic projection attachment with a 1.43:1 vertical unsqueeze may then be used to project the 1.9:1 aspect ratio digital image and produce the final 4:3 projected image. Note that DLP projectors with other aspect ratios may also be supported simply by changing the digital processing and anamorphic projection of the captured image.

In another embodiment of the present invention, a standard television image captured on a digital detector may be digitally stretched vertically by about 34% or digitally squeezed horizontally by about 34% to restore the 2.40:1 aspect ratio, then digitally processed as needed for use in digital applications (digital television, LCD screens on cameras and camcorders, etc.).

BRIEF DESCRIPTION OF THE DRAWINGS

FIG. 1 illustrates an example original film frame generated using the Panavision® anamorphic format.

FIG. 2 illustrates a frame of a film format known as "Super 35," was introduced to reduce the cost of shooting in the anamorphic format or 2.40:1 anamorphic original negative film for conversion and release in a 2.40:1 aspect ratio, per FIG. 1.

FIG. 3 illustrates an exemplary three perforation anamorphic film frame produced by an anamorphic imaging system according to embodiments of the present invention.

DETAILED DESCRIPTION OF PREFERRED EMBODIMENTS

Figure 4:
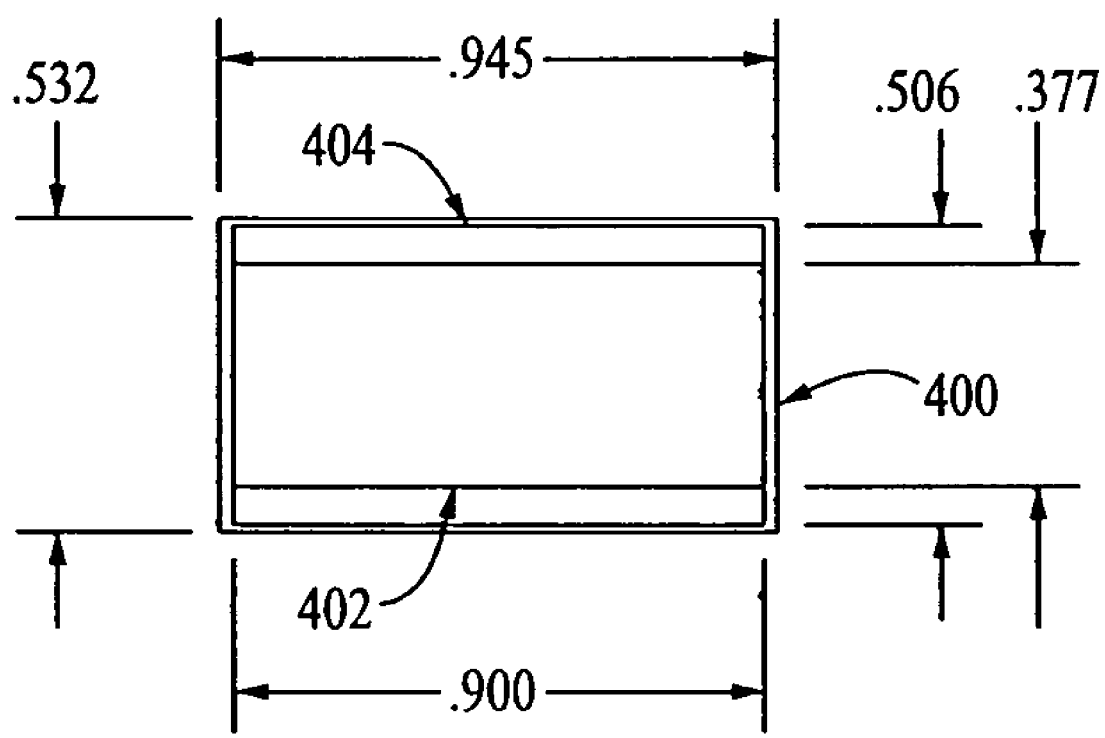
FIG. 4 illustrates an exemplary digital imager capable of capturing a digital image produced by the anamorphic imaging system according to embodiments of the present invention.

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention utilize a maximized 16:9 aspect ratio image capture area to lower display magnification and image degradation due to display magnification, and to reduce the amount of anamorphic squeeze or stretch during photography to lower image degradation due to anamorphosis. The amount of horizontal anamorphic squeeze (for front anamorphs) or vertical anamorphic stretch (for rear anamorphs) used during filming may be in the ratio of 2.40:1 over 16:9 (the ratio of the widescreen display aspect ratio over the image capture aspect ratio or approximately 1.34), or alternatively the amount of vertical anamorphic squeeze (for front anamorphs) or horizontal anamorphic stretch (for rear anamorphs) in the ratio of 16:9 over 1.33:1 (the ratio of the image capture aspect ratio over the standard television display aspect ratio, which is also approximately 1.34) to maximize the image capture area. Note than an anamorphic squeeze or stretch other than the ratio of the widescreen display aspect ratio over the image capture aspect ratio, or alternatively the image capture aspect ratio over the standard television display aspect ratio, will not maximize the image capture area and thus will not maximize overall display image quality.

In film applications, embodiments of the present invention utilize a film frame that is only three perforations in height to reduce the amount of original film needed. FIG. 3 illustrates an exemplary three perforation anamorphic film frame produced by an anamorphic imaging system according to embodiments of the present invention. In the three perforation example of FIG. 3, the total available frame area 300 is approximately 0.980 inches by 0.546 inches, representing an aspect ratio of approximately 1.79:1 and an area available for anamorphic extraction of approximately 0.455 sq. inches, or approximately 80% of the Panavision® 2.40:1 anamorphic projection aperture having an area of 0.569 sq. inches. Embodiments of the present invention capture images in a frame 302 contained within the total available frame area 300 and sized to maximize image area. A widescreen image may be captured within frame 302 using an anamorphic lens with a horizontal squeeze ratio of approximately 1.34, chosen to horizontally squeeze the widescreen image while maximizing the image capture area. In addition, a widescreen image may be captured using a rear anamorphic lens with a vertical stretch ratio of approximately 1.34, chosen to vertically stretch the widescreen image to the size of the frame, as described in related U.S. Utility application Ser. No. 10/923,289 entitled "Anamorphic Imaging System." Alternatively, a standard television image may be captured within frame 302 using an anamorphic lens with a vertical squeeze ratio of approximately 1.34, chosen to vertically squeeze the standard television image while maximizing the image capture area. In addition, the standard television image may be captured using a rear anamorphic lens with a horizontal stretch ratio of approximately 1.34, chosen to horizontally stretch the standard television image to the size of the frame, as described in related U.S. Utility application Ser. No. 10/923,289 entitled "Anamorphic Imaging System." Note that the same anamorphic lens with a 1.34 squeeze or stretch ratio, rotated 90 degrees, may be utilized to capture both formats on the same image capture area.

The frame 302 according to embodiments of the present invention is preferably not chosen to be as wide or as tall as the available frame area 300 to avoid having the frame too close to the perforations or the adjacent frame.

Additionally, the frame 302 may be sized in consideration of digital imagers used for cine applications. Digital imagers may be employed for capturing images for standard television, digital television and motion pictures. The digital standard for high definition television (HDTV) specifies an aspect ratio of 16:9 (1.78:1). Because of the HDTV standard, digital imagers may be designed to have an aspect ratio of approximately 16:9. In addition, because digital imagers may be used for cine applications as well, digital imagers can be designed with a size that approximates the area of three-perforation film as described above. FIG. 4 illustrates a digital imager 400 capable of capturing a 16:9 image 400 for HDTV or a Super 35 frame 402 for cine applications (see reference character 200 in FIG. 2). Note, however, that if image area 402 is used to capture a motion picture frame, approximately 30% of the total imaging area 400 will be unused. If, for example, the digital imager 400 is 1920 pixels wide by 1080 pixels high, the number of active horizontal lines used in image area 402 may be only 800 instead of 1080, and the remainder of the lines will be wasted. As with original Super 35 film, the Super 35 digital frame 402 must be converted to the release print format of FIG. 1, and because the image area is small, image degradation will occur when during magnification. Thus, as with film, embodiments of the present invention seek to maximize the active area of digital imager 400 by capturing a widescreen image using an anamorphic lens with a horizontal squeeze or vertical stretch of approximately 1.34, or by capturing a standard television image using an anamorphic lens with a vertical squeeze or horizontal stretch of approximately 1.34.

Preferred embodiments of the present invention therefore employ an image capture area with dimensions selected in consideration of multiple factors, some applicable to both film and digital applications, and some specific to either film or digital applications. The image capture area is selected to maximize the image area to reduce projection magnification and image degradation due to projection magnification, and reduce the amount of anamorphic squeeze or stretch during filming to lower image degradation due to anamorphosis. Use of a single image capture area also enables the same anamorphic lenses to be used for either film or digital capture. The image capture area is further selected to be only three perforations in height to reduce the amount of original film needed for film applications, and to fit within the maximum three perforation high image area of approximately 0.980 inches by 0.546 inches. The image capture area is still further selected to have an aspect ratio of 16:9 for HDTV, and to fit within the total imaging area of a digital imager of approximately 0.945 inches by 0.532 inches.

The image capture area of preferred embodiments of the present invention is illustrated in FIG. 3 as film area 302 (film applications), and illustrated in FIG. 4 as imaging area 404 (digital applications). In either application, the image capture area is approximately 0.900 inches wide by approximately 0.506 inches tall, providing an aspect ratio of approximately 16:9. The image capture area fits within both the maximum three perforation film frame 300 of FIG. 3 and the total imaging area 400 of FIG. 4. Note that in the film embodiment of FIG. 3, the area at the left of the film frame which is typically reserved for the optical soundtrack is not preserved, and instead the entire width of the negative is used, enabling a larger area to be captured on the film.

For both film and digital cine applications, a widescreen image may be captured using the same anamorphic lens having a 1.34:1 horizontal squeeze or vertical stretch, which is less than the 2:1 horizontal squeeze of the Panavision® anamorphic format. The reduced degree of anamorphosis combined with using practically the entire area of the three perforation film frame 300 or total imaging area 400 (which means less magnification during projection) results in a screen image quality that is at least equivalent, and potentially superior to, the Panavision® anamorphic format, while still providing an approximate 25% film cost savings over the conventional four perforation format. In particular, because only an approximate 1.34:1 powered anamorphic lens is needed to horizontally squeeze or vertically stretch the image during filming, less degradation occurs during filming as compared to the Panavision® anamorphic format which uses an anamorphic lens having a power of 2× in taking. In addition, for standard television applications, a standard television image may be captured using an anamorphic lens having a 1.34:1 vertical squeeze or horizontal stretch. It should be noted that the same anamorphic lens used to produce a 1.34:1 horizontal squeeze or stretch may be rotated 90 degrees to produce a 1.34 vertical squeeze or stretch.

In cine applications, once images are captured either on original film or digitally according to the image capture area of embodiments of the present invention, the image must still be converted to release print film. As described above, most existing conventional projection systems use a projector that (1) pulls down four perforations per frame, (2) requires that the optical soundtrack be recorded along the entirety of the left edge of the film frame, and (3) utilizes an anamorphic projection attachment having a 2:1 power to unsqueeze the image. To be compatible with conventional projection systems, release prints must be therefore be formatted as in FIG. 1 if they are to be projected in the conventional 2.40:1 widescreen format. As described above, the conversion of original film to release print film in the format of FIG. 1 has historically been performed on an optical bench, resulting in image degradation. However, embodiments of the present invention utilize known digital processing techniques implemented by digital image processors to perform the conversion, which avoids the use of optics and the additional degradation that would occur.

Figure 5:
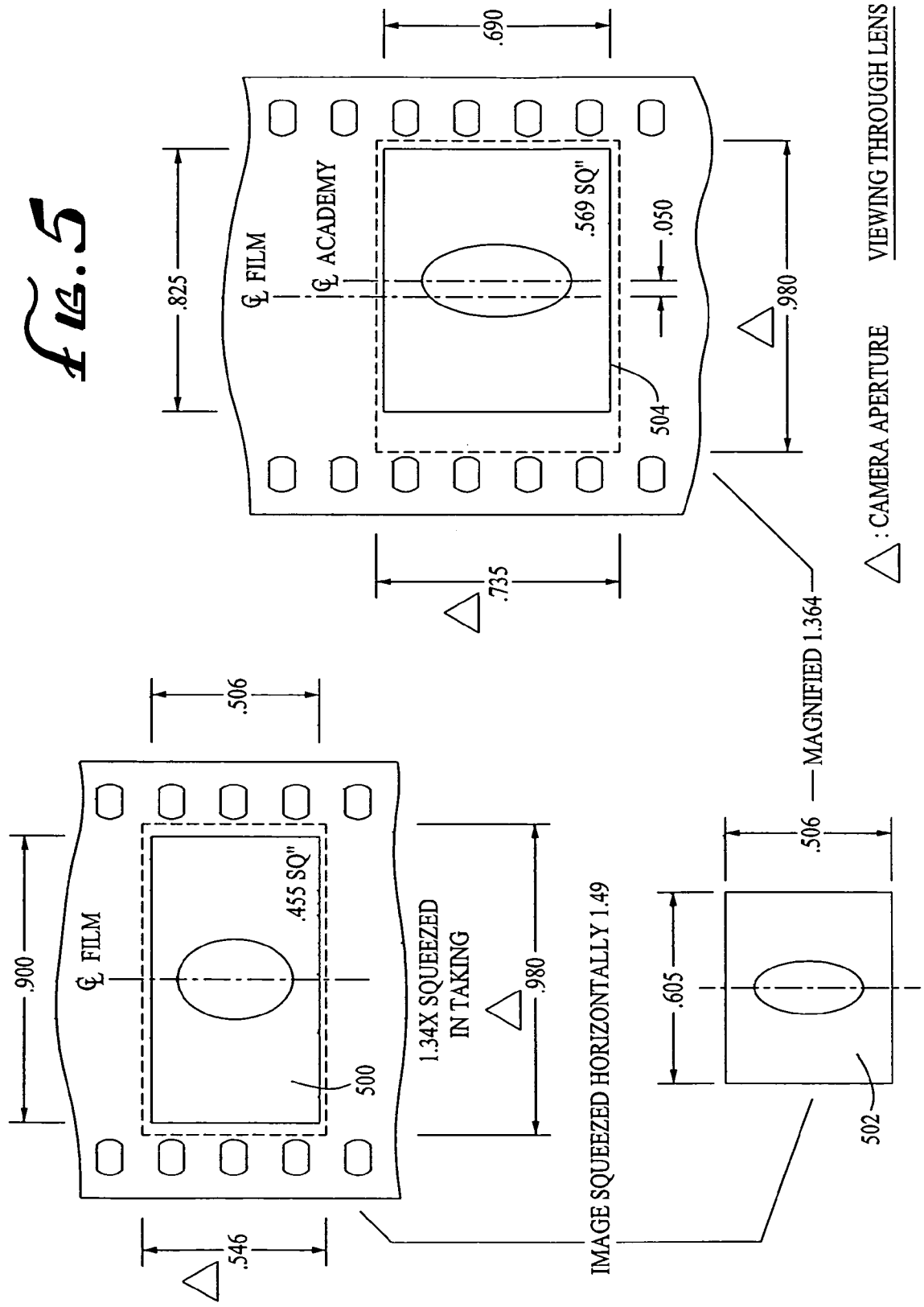
FIG. 5 illustrates one exemplary process for converting a widescreen image captured according to embodiments of the present invention into the final or release print image.

In one exemplary embodiment of the present invention illustrated in FIG. 5, the image on the original film 500 is digitally squeezed horizontally, producing intermediate image 502, and then digitally resampled (while maintaining the aspect ratio of the intermediate image 502) to produce the final or release print image 504. In the exemplary embodiment of FIG. 5, the original image is squeezed by about 49% in the horizontal direction, and the intermediate image is then resampled such that the resulting film print has the format of FIG. 1. However it should be understood that dimensions and percentages listed herein are only exemplary, and that other dimensions and percentages may be employed according to embodiments of the present invention.

Figure 6:
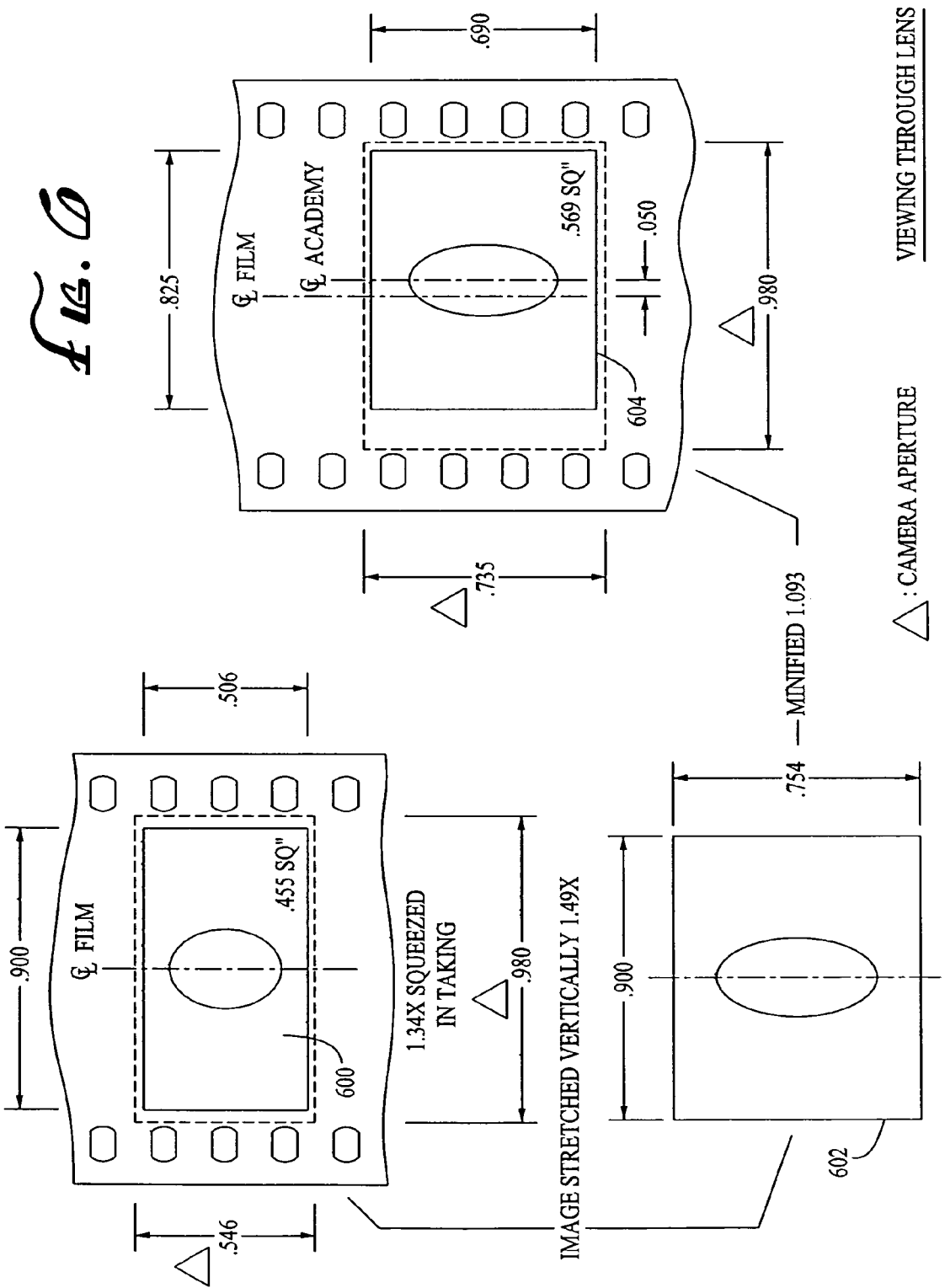
FIG. 6 illustrates another exemplary process for converting a widescreen image captured according to embodiments of the present invention into the final or release print image.

Alternatively, in another exemplary embodiment of the present invention illustrated in FIG. 6, the image on the original film 600 is digitally stretched vertically, producing intermediate image 602, and then digitally resampled such that the resulting film print has the format of FIG. 1 (while maintaining the aspect ratio of the intermediate image 602) to produce the final or release print image 604. In the exemplary embodiment of FIG. 6, the original image is stretched by about 49% in the vertical direction, and the intermediate image is then resampled to give the format of FIG. 1. It should again be understood that dimensions and percentages listed herein are only exemplary, and that other dimensions and percentages may be employed according to embodiments of the present invention. Similar digital processes may be used to convert 16:9 images from a digital imager to the release print film 504 of FIG. 5 or release print film 604 of FIG. 6.

Figure 7:
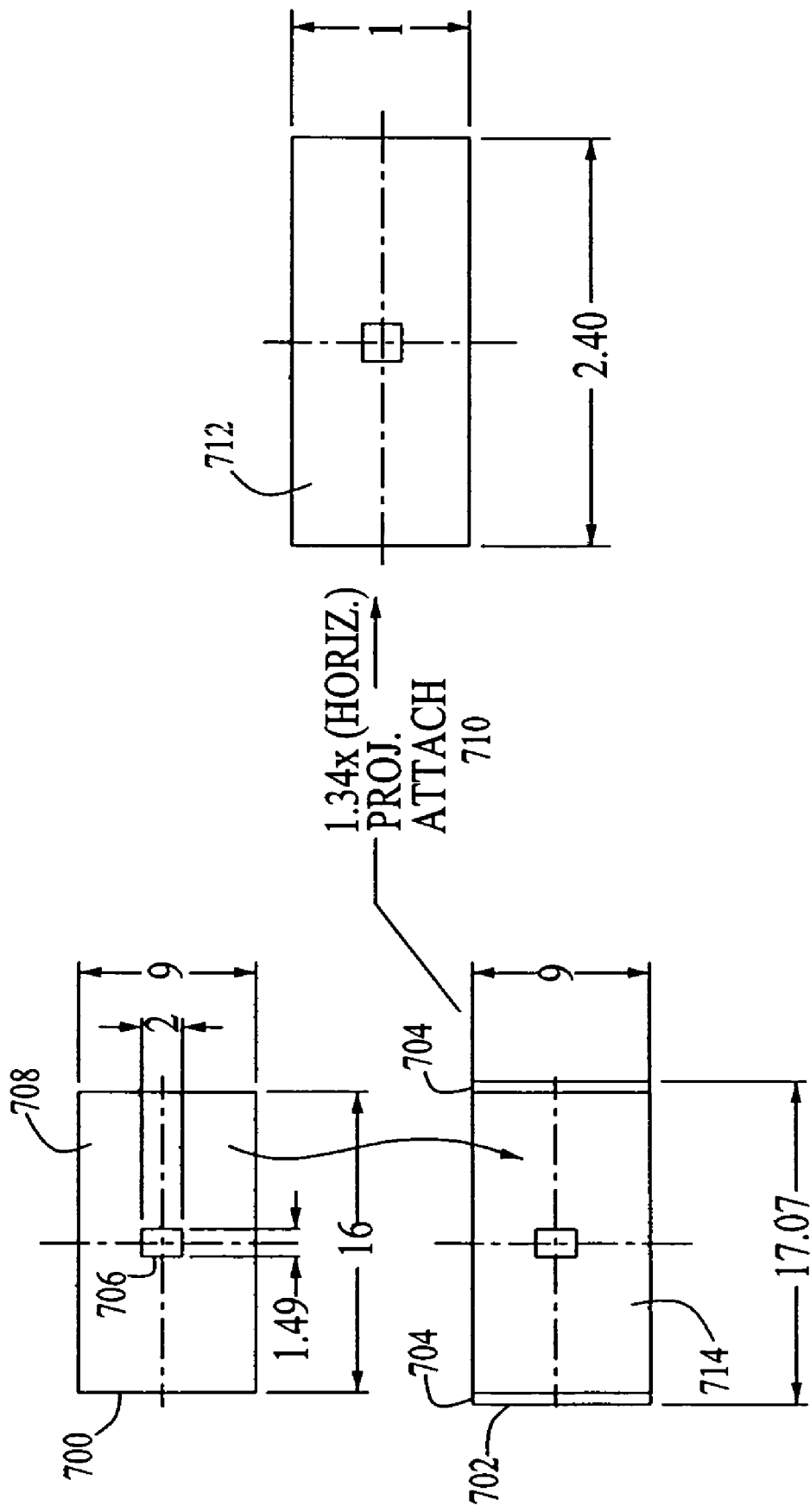
FIG. 7 is an illustration that summarizes the capture of a widescreen image on a digital detector according to embodiments of the present invention, its use in a portion of a projection chip and its subsequent projection using a digital cinema projector.
Figure 8:
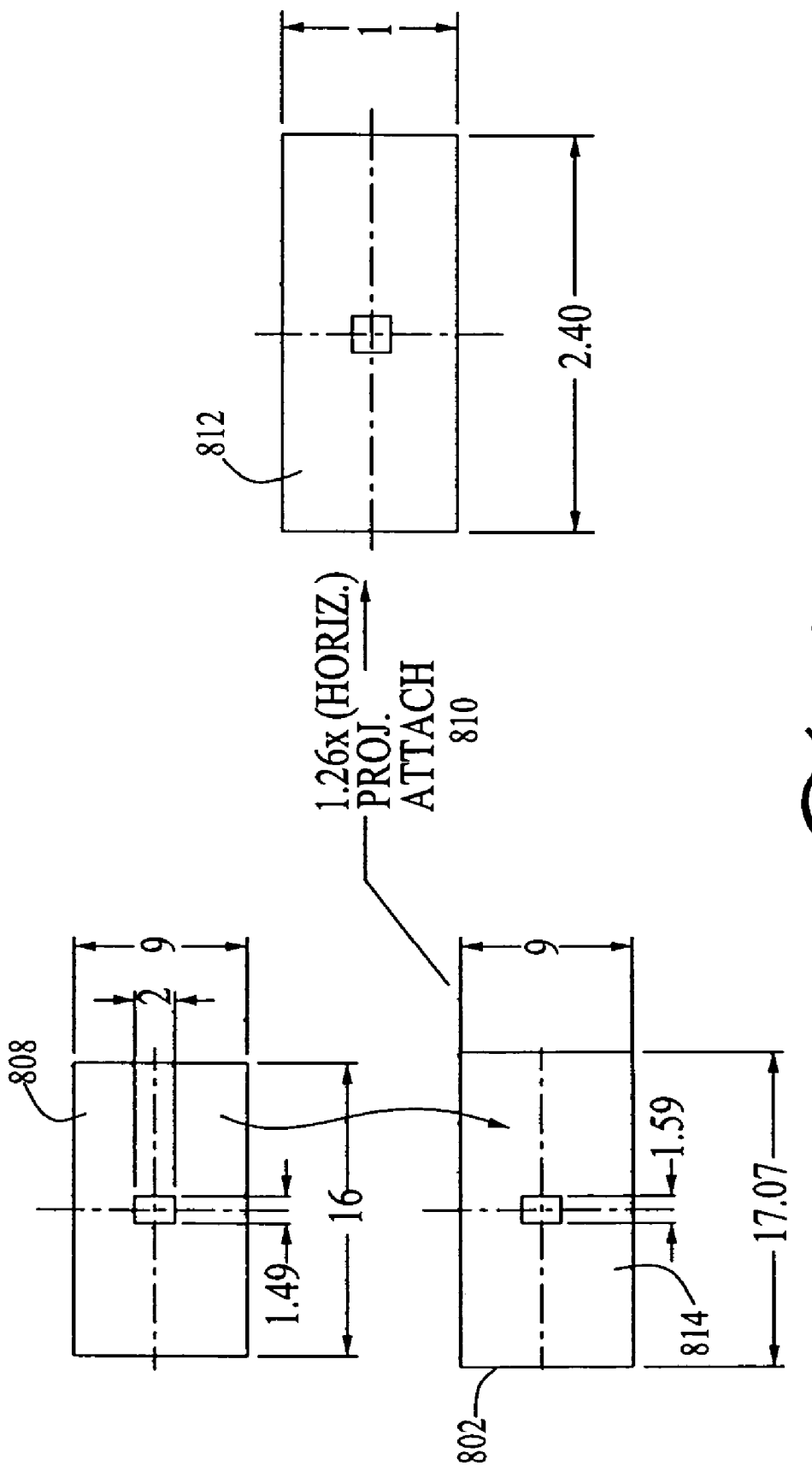
FIG. 8 is an illustration that summarizes the capture of a widescreen image on a digital detector according to embodiments of the present invention, its use in the full area of a projection chip and its subsequent projection using a digital cinema projector.

In another embodiment of the present invention illustrated in FIG. 7, a widescreen image 708 (including a reference square 706 two units wide and two units tall) is captured on a digital detector 700 sized according to embodiments of the present invention (i.e., having an aspect ratio of about 16:9). Note that due to the 1.34× horizontal squeeze, square 706 has a width of only 1.49 units. The captured widescreen image 708 may be digitally magnified or minified as needed, but without further stretching or squeezing, to produce converted image 714, which fits into the display area of projection chip 702 (having an aspect ratio of about 1.9:1) in state of the art digital cinema projectors. In this embodiment, a minimal amount of the width of the projection chip (see areas designated by reference character 704) will not be used. Note that FIG. 7 includes dimensions in arbitrary units, which are provided to indicate aspect ratios only, and are not intended to represent actual sizes. An anamorphic projection attachment with a 1.34:1 horizontal unsqueeze 710 may then be used to project the 1.78:1 aspect ratio captured widescreen image 714 and produce the final 2.40:1 projected image 712. Alternatively, as illustrated in FIG. 8, the captured widescreen image 808 may be converted using digital processing techniques (magnifying, minifying, stretching or squeezing as needed) implemented by digital image processors to produce converted image 814, which precisely fit the 1.9:1 aspect ratio projection chip 802. An anamorphic projection attachment with a 1.26:1 horizontal unsqueeze 810 may then be used to project the 1.9:1 aspect ratio digital image 814 and produce the final 2.40:1 projected image 812. Note that digital cinema projectors with other aspect ratios may also be supported simply by changing the digital processing and anamorphic projection of the captured image.

In another embodiment of the present invention, a widescreen image captured on a digital detector sized according to embodiments of the present invention may be digitally stretched horizontally by about 34% or digitally squeezed vertically by about 34% to restore the 2.40:1 aspect ratio, then digitally processed as needed for use in digital applications (digital television, LCD screens on cameras and camcorders, etc.).

Figure 9:
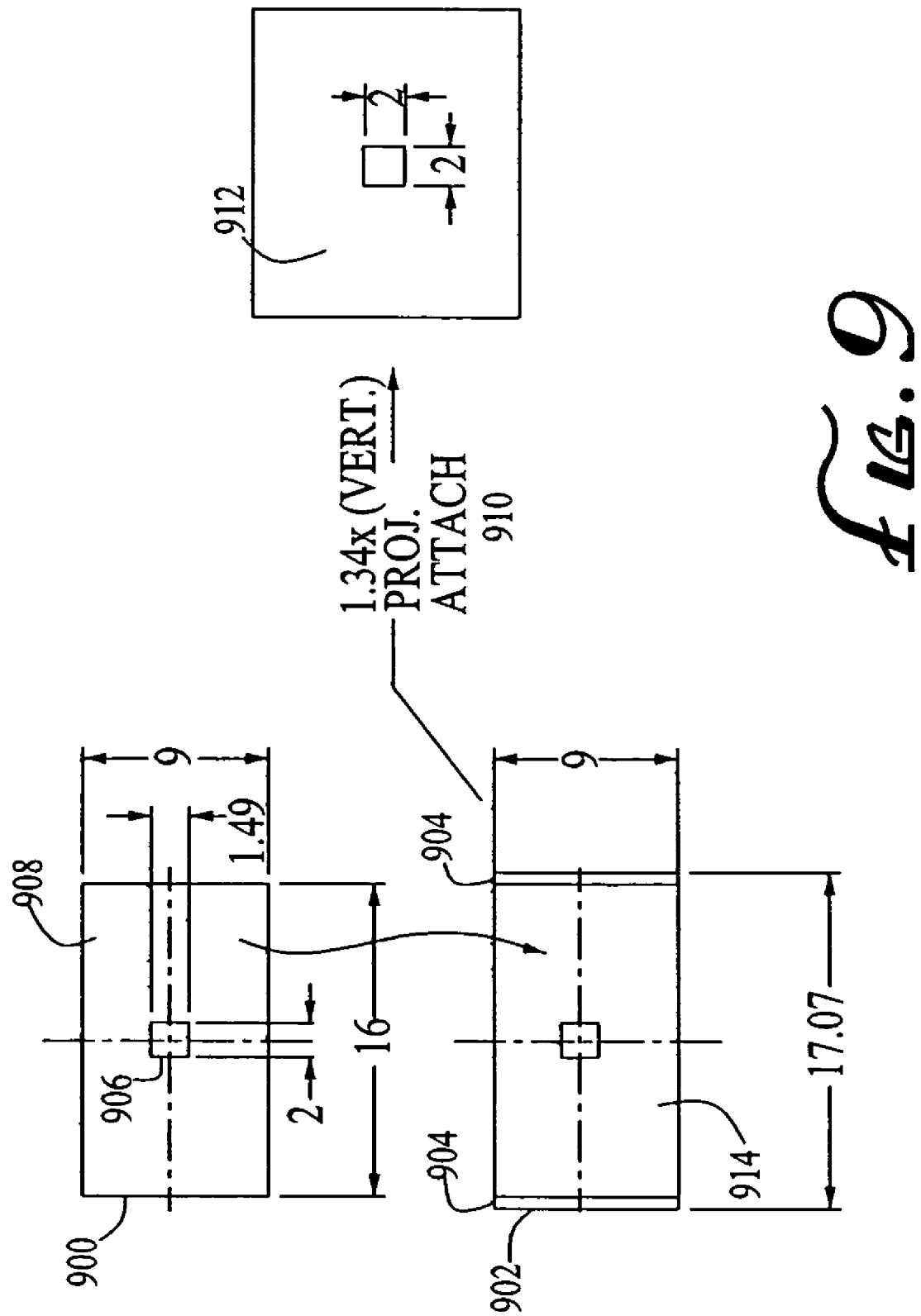
FIG. 9 is an illustration that summarizes the capture of a standard television image on a digital detector according to embodiments of the present invention, its use in a portion of a projection chip and its subsequent projection using a digital cinema projector.
Figure 10:
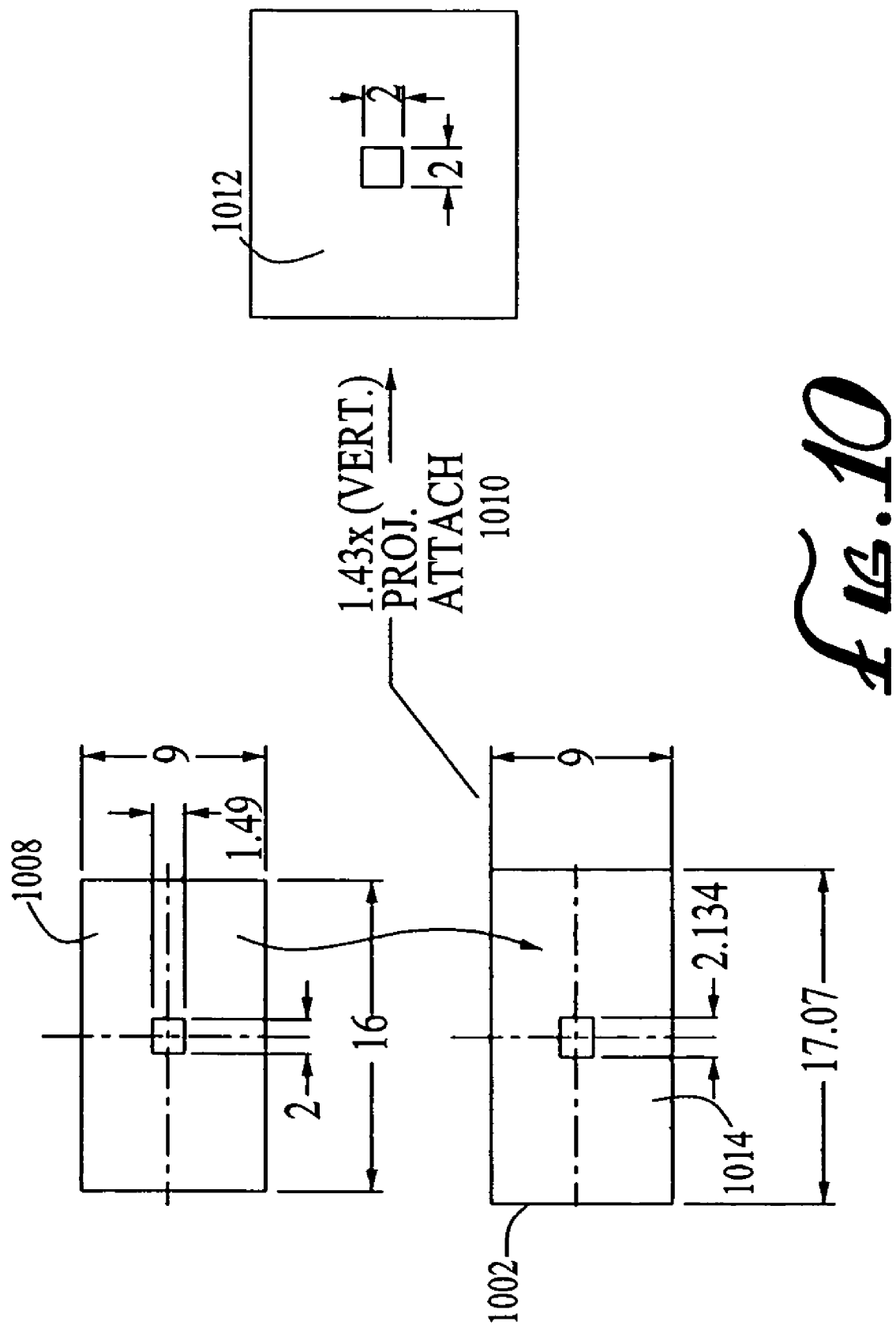
FIG. 10 is an illustration that summarizes the capture of a standard television image on a digital detector according to embodiments of the present invention, its use in the full area of a projection chip and its subsequent projection using a digital cinema projector.

In another embodiment of the present invention illustrated in FIG. 9, a standard television image 908 (including a reference square 906 two units wide and two units tall) is captured on a digital detector 900 sized according to embodiments of the present invention (i.e., having an aspect ratio of about 16:9). Note that due to the 1.34× vertical squeeze, square 906 has a height of only 1.49 units. The captured widescreen image 908 may be digitally magnified or minified as needed, but without further stretching or squeezing, to produce converted image 914, which fits into the display area of projection chip 902 (having an aspect ratio of about 1.9:1) in some state of the art digital cinema projectors. In this embodiment, a minimal amount of the width of the projection chip (see areas designated by reference character 904) will not be used. Note that FIG. 9 includes dimensions in arbitrary units, which are provided to indicate aspect ratios only, and are not intended to represent actual sizes. An anamorphic projection attachment with a 1.34:1 vertical unsqueeze 910 may then be used to project the 1.78:1 aspect ratio captured standard television image 914 and produce the final 4:3 projected image 912. Alternatively, as illustrated in FIG. 10, the captured standard television image 1008 may be converted using digital processing techniques (magnifying, minifying, stretching or squeezing as needed) implemented by digital image processors to produce converted image 1014, which precisely fit the 1.9:1 aspect ratio projection chip 1002. An anamorphic projection attachment with a 1.43:1 horizontal unsqueeze 1010 may then be used to project the 1.9:1 aspect ratio digital image and produce the final 4:3 projected image 1012. Note that digital cinema projectors with other aspect ratios may also be supported simply by changing the digital processing and anamorphic projection of the captured image.

In another embodiment of the present invention, a standard television image captured on a digital detector may be digitally stretched vertically by about 34% or digitally squeezed horizontally by about 34% to restore the 4:3 aspect ratio, then digitally processed as needed for use in digital applications (digital television, LCD screens on cameras and camcorders, etc.).

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for capturing a standard television image during original photography when an image capture aspect ratio differs from a display aspect ratio such that an image quality of the image is maximized, comprising:
choosing an anamorphic ratio of a taking lens during original photography to be approximately the image capture aspect ratio divided by the display aspect ratio;
vertically squeezing or horizontally stretching the standard television image using the taking lens; and
capturing the image in a frame sized to utilize as much of a total available frame area as possible;
wherein the image capture aspect ratio is selected to be equivalent to a 16:9 aspect ratio of a digital imager.

2. The method as recited in claim 1, the total available frame area having a height equivalent to not more than the height of three perforations in film having regular perforations on a left and right side of the film and a width equivalent to not more than a distance between the perforations on the left and right side of the film.

3. The method as recited in claim 2, further comprising choosing the anamorphic ratio to be approximately 1.34:1.

4. The method as recited in claim 1, further comprising selecting the anamorphic ratio and sizing the frame to provide an image capture area of approximately 0.900 inches wide by approximately 0.506 inches tall.

5. A method for generating a digital image suitable for display in a digital cinema projector from images captured according to the method of claim 1, the digital cinema projector including a projection chip having a display area, the method comprising:
magnifying or minifying the captured image as needed using digital processing techniques to produce a digital image that utilizes as much of the total availablearea of the display area as possible.

6. A method for generating a digital image suitable for display in a digital cinema projector from images captured according to the method of claim 1, the digital cinema projector including a projection chip having a display area, the method comprising:
magnifying, minifying, stretching or squeezing the captured image as needed using digital processing techniques to produce a digital image that utilizes the entire display area.

7. A method for generating a digital image suitable for display in a digital application from images captured according to the method of claim 1, the method comprising:
vertically stretching the captured image by about 34% to produce an intermediate image; and
magnifying or minifying the intermediate image as needed using digital processing techniques to produce a digital image suitable for the digital application.

8. A method for generating a digital image suitable for display in a digital application from images captured according to the method of claim 1, the method comprising:
horizontally squeezing the captured image by about 34% to produce an intermediate image; and
magnifying or minifying the intermediate image as needed using digital processing techniques to produce a digital image suitable for the digital application.

9. An anamorphic imaging system for capturing a standard television image, comprising:
a detector for capturing the standard television image; and
an anamorphic lens for vertically squeezing or horizontally stretching the standard television image into an image capture area that fits within the detector;
wherein the anamorphic lens has a vertical squeeze or horizontal stretch ratio chosen to maximize the image capture area and image quality by utilizing as much of the detector as possible while maintaining an aspect ratio of about 16:9.

10. The anamorphic imaging system as recited in claim 9, the detector having a height equivalent to not more than the height of three perforations in film having regular perforations on a left and right side of the film and a width equivalent to not more than a distance between the perforations on the left and right side of the film.

11. The anamorphic imaging system as recited in claim 9, wherein the anamorphic lens has a vertical squeeze or horizontal stretch of approximately 1.34:1.

12. The anamorphic imaging system as recited in claim 9, wherein the anamorphic lens has a vertical squeeze or horizontal stretch selected to enable the image capture area to fit within the dimensions of a digital imager.

13. The anamorphic imaging system of claim 9, further comprising:
a digital image processor for generating a digital image from the captured standard television image, the digital image suitable for display in a digital cinema projector including a projection chip having a display area, the digital image processor programmed for
magnifying or minifying the captured image as needed using digital processing techniques to produce a digital image that utilizes as much of the display area as possible.

14. The anamorphic imaging system of claim 9, further comprising:
a digital image processor for generating a digital image from the captured standard television image, the digital image suitable for display in a digital cinema projector including a projection chip having a display area, the digital image processor programmed for
magnifying, minifying, stretching or squeezing the captured image as needed using digital processing techniques to produce a digital image that utilizes the entire display area.

15. The anamorphic imaging system of claim 9, further comprising:
a digital image processor for generating a digital image from the captured standard television image, the digital image suitable for display in a digital application, the digital image processor programmed for
vertically stretching the captured image by about 34% to produce an intermediate image, and
magnifying or minifying the intermediate image as needed using digital processing techniques to produce a digital image suitable for the digital application.

16. The anamorphic imaging system of claim 9, further comprising:
a digital image processor for generating a digital image from the captured standard television image, the digital image suitable for display in a digital application, the digital image processor programmed for
horizontally squeezing the captured image by about 34% to produce an intermediate image, and
magnifying or minifying the intermediate image as needed using digital processing techniques to produce a digital image suitable for the digital application.

17. A method for capturing a widescreen image during original photography when an image capture aspect ratio differs from a display aspect ratio such that an image quality of the image is maximized, and generating a release print image from the captured widescreen image, comprising:
   choosing an anamorphic ratio of a taking lens during original photography to be approximately the display aspect ratio divided by the image capture aspect ratio;
   capturing the image in a frame sized to utilize as much of a total available frame area as possible;
   vertically stretching or horizontally squeezing the captured image utilizing digital processing techniques to produce an intermediate image; and
   resampling the intermediate image both horizontally and vertically using digital processing techniques to generate the release print image;
   wherein the image capture aspect ratio is selected to be equivalent to a 16:9 aspect ratio of a digital imager.

18. The method as recited in claim 17, further comprising:
   stretching the captured image by about 49% in a vertical direction to produce the intermediate image; and
   resampling the intermediate image by about 9.3% in both the horizontal and vertical directions.

19. The method as recited in claim 17, further comprising:
   squeezing the image by about 49% in the horizontal direction to produce the intermediate image; and
   resampling the intermediate image by about 36.4% in both the horizontal and vertical directions.

* * * * *